United States Patent
Barrus et al.

(10) Patent No.: US 9,304,618 B2
(45) Date of Patent: Apr. 5, 2016

(54) CREATING A SUMMARY OF CONTENT AND STROKE ASSOCIATION

(71) Applicants: John Barrus, Menlo Park, CA (US); Michael Gormish, Redwood City, CA (US)

(72) Inventors: John Barrus, Menlo Park, CA (US); Michael Gormish, Redwood City, CA (US)

(73) Assignee: RICOH CO., LTD., Tokyo (JP)

( * ) Notice: Subject to any disclaimer, the term of this patent is extended or adjusted under 35 U.S.C. 154(b) by 41 days.

(21) Appl. No.: 14/194,508

(22) Filed: Feb. 28, 2014

(65) Prior Publication Data

US 2015/0248760 A1 Sep. 3, 2015

(51) Int. Cl.
  G06K 9/46 (2006.01)
  G06F 3/041 (2006.01)
  G06K 9/00 (2006.01)

(52) U.S. Cl.
  CPC . G06F 3/041 (2013.01); G06K 9/00 (2013.01)

(58) Field of Classification Search
  CPC ............. G06K 2209/01; G06K 9/2081; G06F 3/04883
  See application file for complete search history.

(56) References Cited

U.S. PATENT DOCUMENTS

| | | | | |
|---|---|---|---|---|
| 7,171,056 B2* | 1/2007 | Zhang | ...................... | G06K 9/32 382/266 |
| 7,219,233 B1* | 5/2007 | Hendriks et al. | .............. | 713/182 |
| 7,260,278 B2* | 8/2007 | Zhang et al. | .................. | 382/305 |
| 8,504,624 B2 | 8/2013 | Gormish et al. | | |
| 9,013,454 B2* | 4/2015 | Barrus et al. | .................. | 345/179 |
| 2003/0058227 A1* | 3/2003 | Hara et al. | ...................... | 345/178 |
| 2007/0255706 A1* | 11/2007 | Iketani et al. | ...................... | 707/6 |
| 2010/0251106 A1 | 9/2010 | Barrus et al. | | |
| 2011/0057884 A1* | 3/2011 | Gormish | ................... | G06F 9/54 345/173 |
| 2012/0229425 A1* | 9/2012 | Barrus et al. | .................. | 345/179 |

OTHER PUBLICATIONS

Harris, Chris, et al, "A combined corner and edge detector," Alvey Vision Conference, vol. 15, 1988, pp. 147-152.
Rublee, Ethan, et al, "ORB: An efficient alternative to SIFT or SURF," ICCV, 2011, 8 pages.
Shi, Jianbo, et al, "Good features to track," Computer Vision and Pattern Recognition, Jun. 1994, Proceedings CVPR'94, IEEE Computer Society Conference.

* cited by examiner

*Primary Examiner* — Gregory M Desire
(74) *Attorney, Agent, or Firm* — Blakely, Sokoloff, Taylor & Zafman LLP

(57) ABSTRACT

A method and apparatus for summarizing a session are described. In one embodiment, the system associates strokes with image data and comprises: a display surface; a memory coupled to the display surface to store stroke contexts for a plurality of strokes, wherein each stroke context represents an association between at least one stroke and a portion of image data previously displayed; a stroke capture module operable with the display surface and communicably coupled with the memory to capture one or more strokes written over image data presented on the display surface; and a summarization unit coupled to the memory to generate a summary of a session based on content displayed during the session containing one or more strokes made during the session.

20 Claims, 10 Drawing Sheets

Stroke Capture & Display

CREATING A SUMMARY OF CONTENT AND STROKE ASSOCIATION

FIELD OF THE INVENTION

Embodiments of the present invention relate to the field of document image processing; more particularly, embodiments of the present invention relate to associating strokes with portions of a document image so that the strokes remain with the content of document image to which they are associated when the document is removed from or returned to a display.

BACKGROUND OF THE INVENTION

There are many ways to use an interactive whiteboard for marking up information. The board can show a white background which allows the user to draw as if it were a regular whiteboard. Alternatively, a personal computer (PC) display can be shown on the background and the user can draw on the displayed image.

Using techniques such as the SMART Technologies, Inc. drivers and a SMART Board®, a user can display any background, including a word document, an image, a web page, a PowerPoint presentation, a video, an entire PC display or virtually anything else. When the user picks up a pen from the SMART Board® pen tray, the SMART Board® drivers capture the current screen and freeze it. Any strokes written by the user are overlaid on the frozen screen image. If a PC is connected to the SMART Notebook™ software, even if a video is running, the image is frozen while the user writes. Once the user indicates the she is finished drawing through the user interface, the screen image with the strokes is captured and stored and the screen is unfrozen.

There are a number of problems associated with current whiteboard systems.

A first problem with current interactive whiteboard systems is that there is a separation between the source of the content and the source of the markup, or strokes, on the whiteboard. The users provide content (e.g., images) via video, such as by plugging in a personal computer (PC) and strokes are made by a user at the whiteboard. Because the images and strokes are sourced independently, they can get out of sync with each other when the image changes. For example, if a user scrolls an image at the PC, the images changes on the whiteboard but the strokes made to the previously displayed image may still remain and not be cleared until a user request. This makes such existing whiteboard systems sluggish. One could attempt to freeze the content and allow the markup to occur on the content at that time, but then the user cannot scroll the image or zoom into a portion of it. This is a cumbersome approach.

Another problem with current whiteboard systems is that they do not include a user interface that provides a positive user experience. Users often want to keep track of the images upon which they have added markups. For example, as a user is using the whiteboard and marking up content, the user would like to keep their strokes with the old content even if the content has changed. In order to save a page and any strokes made on whiteboard over content being displayed thereby after a change of the displayed content, existing whiteboard systems require a user who is controlling the content that is being displayed by the whiteboard to return to the page onto which the strokes were drawn to then allow the whiteboard user to save the page with image and strokes together. Thereafter, the user controlling the supply of content to the whiteboard system can change to a new page, and the whiteboard user can delete strokes and begin to mark up the next page. This is a very cumbersome process.

Lastly, another problem associated with current whiteboard systems is that they do not provide print output of what transpired in a session with the whiteboard.

Another solution is to have the strokes and content remain independent using an independent stroke layer. A problem with this approach is the when the image changes, the old strokes remain on the display. The portion of the document over which the strokes were written may no longer be. Thus, if the image is scrolled or changed, the strokes remain.

Since there are hundreds of thousands (or perhaps millions) of applications available for the PC, Mac and Linux platforms, and many different stroke input technologies, it is a complex problem to integrate stroke input techniques with every program.

SUMMARY OF THE INVENTION

A method and apparatus for summarizing a session are described. In one embodiment, the system associates strokes with image data and comprises: a display surface; a memory coupled to the display surface to store stroke contexts for a plurality of strokes, wherein each stroke context represents an association between at least one stroke and a portion of image data previously displayed; a stroke capture module operable with the display surface and communicably coupled with the memory to capture one or more strokes written over image data presented on the display surface; and a summarization unit coupled to the memory to generate a summary of a session based on content displayed during the session containing one or more strokes made during the session.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
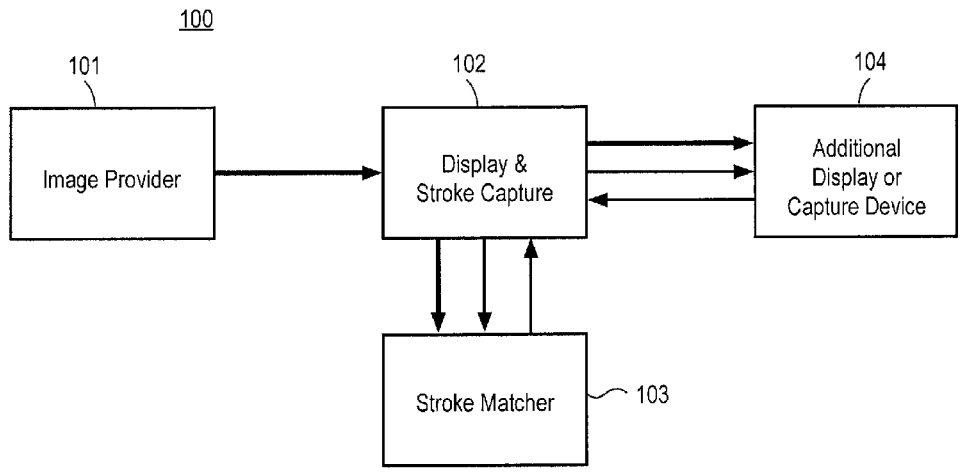
FIG. 1 is a block diagram of one embodiment of a display and stroke matching system 100.

Embodiments of the invention allow a user to draw on a screen (e.g., PC screen, whiteboard, etc.) and annotate a shared background image. This is accomplished by associating strokes made on the screen with the underlying shared background. Using the techniques described herein, the user is allowed to draw on part of a presentation, text document, or other image and then scroll to a different page or part of the document or image. Thereafter, the strokes that were drawn on the screen become associated with the part of the image (e.g., document) on which they were originally written. When changing the image that is displayed, the strokes on screen disappear completely; when scrolling the image, the marks are moved on the display to the part of the image where they were originally drawn. If the user scrolls to a different image then the strokes disappear, and upon returning to the original image the marks reappear in their correct location (i.e., over the location on the original page upon which they were made).

The techniques described herein solve the problems described above.

In one embodiment, the following terms are used in the specification:

1) image—a 2D representation suitable for display. In one embodiment, an image is a "screen capture". This screen capture may be from a camera or other sensor, or automatically generated even if not displayed on a screen.

2) stroke—markup data, usually handwriting intended to be displayed on top of an image. A stroke includes sufficient data to redisplay the intended markup. Stroke data might consist of a set of sample points, and a "pen width" or other one dimensional sample data, or stroke data might be a rendered 2D image of what the stroke should like, probably with transparency or mask information so that it can be rendered on top of an image.

3) stroke id—a unique identifier for a stroke data. Access to a stroke ID typically does not allow rendering, but is much more compact than having all of the data for a stroke. In some embodiments, a stroke ID might be an integer, e.g. "5", a UUID, or a string.

4) feature points—locations in images. In one embodiment, the feature points are points which can be identified even if the image is captured with a different rotation, scale, view angle, illumination, etc.

5) descriptors—a vector (binary, discrete or continuous) based on the neighborhood of a feature point. In one embodiment, the descriptor changes only a little if the image is captured in a different manner 6) transformation—a description of how handwriting saved as a stroke should be scaled, stretched, rotated or otherwise modified in order to be superimposed on an image so that it will appear in the correct location on that image. This is to solve the problem that the strokes are written at one location on the screen but the image on which the strokes were written may move with respect to the screen and the strokes will need to move with the image.

7) page—a single image. In one embodiment, the page contains a stroke possibly displayed as a thumbnail alongside or below the main display area or used as summary information at the end of a meeting.

8) context—information associated with a stroke id, includes feature points and descriptors, may include an image, includes a region associated with a stroke, usually a bounding box, may include additional information having to do with the stroke capture, time, application running, top most window.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview of One Embodiment of a Display System

To provide a pleasing experience when writing independently sourced strokes on a display surface that is displaying independently sourced content, techniques for associating strokes with the underlying content on the display surface is disclosed. In one embodiment, the apparatus comprises a memory (e.g., a database) and a matching module coupled to the memory. The memory stores contexts for a plurality of strokes, and each context represents an association between at least one stroke and a portion of image data previously displayed.

The matching module receives an indication of a new stroke to be associated a first image and a first context, determines if the portion the first context is the same as, overlaps or is independent of the contexts stored in the memory, and updates the memory to include the new stroke by adding the new stroke to one of the contexts stored in the memory or storing the new stroke with the first context independent of the contexts already stored in the memory.

In one embodiment, the matching module adds the new stroke to the one context with feature points being added based on an amount of feature similarity between the first image and an image associated with the one context. In another embodiment, the matching module adds the new stroke to the context without adding feature points if the first context and the one context are equal. In yet another embodiment, the matching module adds the new stroke to the context with only one or more feature points associated with a portion of the first image that does not overlap an image associated with the one context.

In one embodiment, the matching module stores the new stroke and at least one of other stroke that appeared together in a context group, where the new stroke and the one other stroke have different feature points that are stored together with feature points of the context group. In one embodiment, the first context comprises information indicative of an application program associated with the first image, and further wherein stroke matching module is operable to use the information for retrieval.

In one embodiment, the matching module, responsive to another image, determines if image data of that image is associated with one of the contexts stored in the memory and returns information identifying one or more strokes of the context associated with the second image data and transformation information to transform the one or more strokes of the associated context for display on a display surface. In one embodiment, the information identifying the one or more strokes comprises a stroke ID. In one embodiment, the matching module uses sequence information associated with a sequence in which images were displayed to select which of the contexts in the memory to compare first if the second image matches as least partially with image data associated with the one context. In another module, the matching module compares the second image data with a set of recently matched contexts before searching other contexts stored in the memory when determining if the second image matches as least partially with image data of one or more of the contexts stored in the memory.

FIG. 1 is a block diagram of one embodiment of a display and stroke matching system 100. This system may be referred to herein as an interactive whiteboard (IWB) system. Referring to FIG. 1, system 100 includes image provider 101, display and capture device 102, stroke matcher 103 and additional display or capture device 104. The components shown in FIG. 1 may be integrated into the same unit or may be implemented separately and/or remotely with respect to each other for example. For example, stroke matcher 103 may be implemented using a remote server or a separate computer system.

Image provider 101 is a source of one or more images that are sent for display on a screen or surface of display and stroke capture device 102. In one embodiment, image provider 101 comprises a personal computer (PC). In one embodiment, image provider 101 comprises a camera. In another embodiment, image provider 101 comprises any image source that provides content for display.

Display and stroke capture device 102 includes a display surface to display images from image provider 101. Display and stroke capture device 102 also captures strokes made to or on the display and sends information corresponding to the captured strokes to stroke matcher 103.

Stroke matcher 103 stores information corresponding to the captured stroke (e.g., stroke ID) received from display and capture device 102 in a memory (e.g., database, etc.) accessible and/or part of stroke matcher 103. Stroke matcher 103 also receives the images that are provided by image provider 101, either directly or indirectly via display and stroke capture device 102. In response to these images, stroke matcher 103 finds strokes that are associated with, and thus could be applied to, the display of the image that has been stored in the memory and provides the stroke information to display and stroke capture device 102 to enable strokes corresponding to the stroke information to be incorporated in the display with the image to which they are associated.

In one embodiment, system 100 also includes an additional display and/or capture device 104.

In one embodiment, a controller (not shown) acts as a central component for performing processing that controls and enables the various functions provided by the IWB system. Such a controller may be operatively coupled to one or more other components of the IWB system and configured to control and/or coordinate the functions performed by these components. For example, the controller may be operatively coupled to display and stroke capture device 102 and/or to display the display surface and configured to receive captured information.

Figure 11:
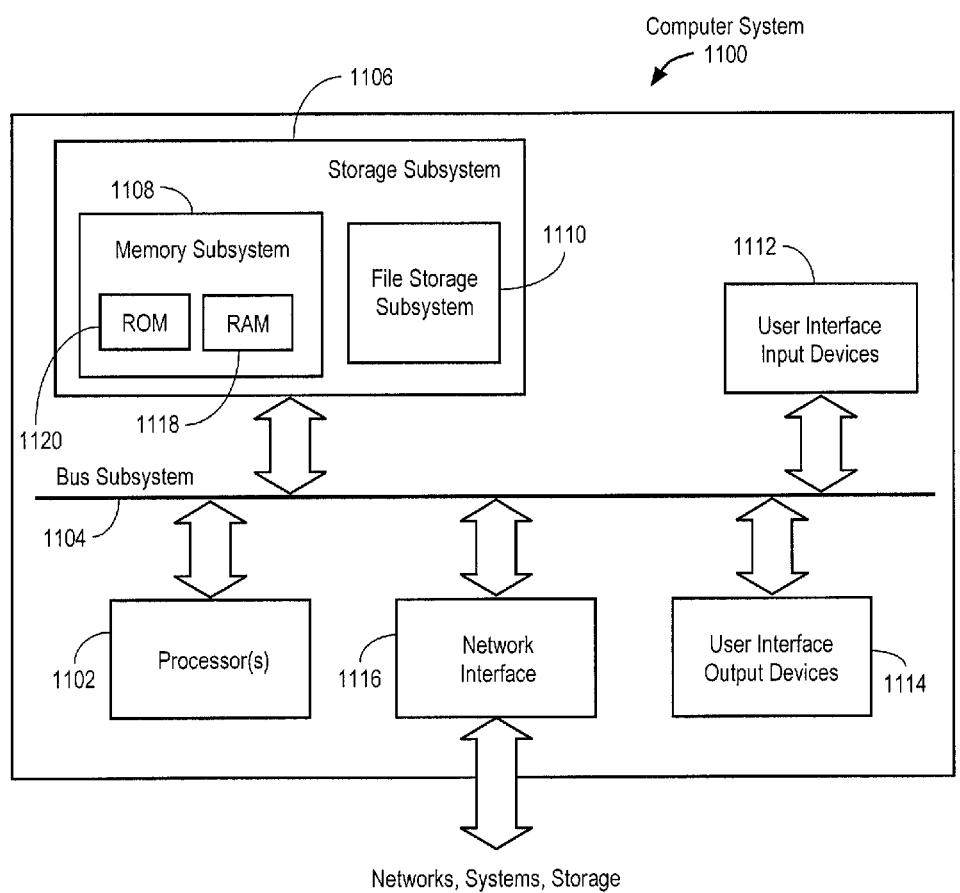
FIG. 11 is a block diagram of a computer system that may be used to practice an embodiment of the present invention.

The system including display and stroke capture device 102, stroke matcher 103 and the associated controller may be implemented as a processor-based computing device. An example of such an implementation is depicted in FIG. 11 and described below. In alternate embodiments, the components may be implemented, at least in part, with a processor, a programmable logic device, and the like. The system may execute one or more programs (code instructions), which when executed by a processor (e.g., the process of the system in FIG. 11).

The IWB system may be coupled to or together with a communication network and be capable of communicating with other devices, including other IWB systems, and storage connected to the communication network. The communication network may be a single communication network or a collection of communication networks. The networks may include the Internet, an intranet, a local area network (LAN), a wide area network (WAN), a wireless network, a private network, a public network, a switched network, or any other suitable communication network that enables communications between the IWB system and other devices or systems coupled to the communication network. One or more different communication protocols (e.g., Ethernet, various wireless protocols) may be used to facilitate the communications using the communication network.

In one embodiment, the IWB system provides a network interface that couples the IWB system to the communication network and facilitates communications via the communication network. The IWB system may be connected to the communication network via wired or wireless links.

The components of the IWB system may comprise one or more modules that provide the functionality described herein. These modules may be implemented in hardware, software, or combinations thereof. For example, in one embodiment, a module may be implemented in software (program, code, instructions), which when executed by a processor the functionality provided by stroke matcher 103.

Display and Stroke Capture

These display surface (also sometime referred to as the "whiteboard" or "drawing surface" of the IWB system) of display and stroke capture 102 provide both an input and an output interface for users of the IWB system. As an input interface, it enables a user to provide writing (also referred to as drawing) input, which is then converted to digital information (also referred to as digital representation of the writing). As an output interface, digital information may be projected on to the display surface by a projector such that the projected information can be viewed by one or more users of the IWB system. One or more users of the IWB system may provide input to the IWB system by writing using one or more writing instruments. For example, a user may write on the display surface using a writing instrument. The term writing or drawing or writing information, as used in this application, may include one or more characters, letters, symbols, words, sentences, tables, drawings, sketches, figures, or any other type of input that can be provided using a writing instrument. As another example, a writing or drawing can include handwritten letters, numbers, or symbols, expressed in any language or format. As yet another example, a writing or drawing can comprise a combination of hand-drawn pictorial and textual elements.

In one embodiment, the user's writings made using the writing instrument are captured and communicated to a controller, which determines digital information corresponding to the writings. The digital information may then be communicated to a projector for projection on to the display surface. The digital information may be in various forms such as a series of strokes, a pixel-based image, plain or formatted text, and the like.

A user of the IWB system may use various different writing instruments to write or provide input. In one embodiment, the writing instrument may be a physical object that may or may not leave a visible mark on the display surface. For example, a user may use his finger as a writing instrument to write on the display surface. Even though the finger may not leave any visible mark on the display surface, the finger's movements are captured and then translated to digital information, which may then be projected on the display surface. As another example, the user may use a pointer or a stylus as a writing instrument to write on the display surface, where the stylus may not leave any physical visible mark on the display surface. In other embodiments, a user may also use a writing instrument that leaves a visible mark on the display surface. For example, a user may use a pen or a regular dry erase marker to write on the display surface. The user's writings are captured, digital information corresponding to the writings determined, and the digital information then projected on the display surface.

In one set of embodiments, in addition to writing, a writing instrument may also be used to interact in other ways with the IWB system. For example, in one embodiment, the writing instrument may be used to erase previously written information.

The display surface of display and stroke capture device 102 may be a passive or active surface. In one embodiment, the display surface may be a passive surface that simply accepts marks from a pen than can be identified by an external sensor like a camera. For example, the display surface may be a plain old opaque whiteboard. In another embodiment, the display surface may be an active surface like a surface containing a sensor, for example from Wacom Co., Ltd in Japan. Such sensors contain an antenna and interact with Radio Frequency Identification (RFID) pens containing a passive coil. By activating the antenna in a specific way, the pen can be triggered and the antenna can measure the pen's response to the antenna and identify the pen's location and orientation. Other active surfaces include resistive touch systems which measure a change in resistance to identify the location of an object pressing against the screen. Other examples of active surfaces include glass boards surrounded with infrared LEDs which use "frustrated total internal reflection" (FTIR) to allow a camera to capture the location of a finger or pen on the surface or a capacitive touch screen like those found on iPad and iPhone devices from Apple, Inc. in Cupertino, Calif.

In one embodiment, display and stroke capture device 102 is configured to capture the writings made by a user using a writing instrument. The writing information captured by display and stroke capture device 102 may then be communicated to stroke matcher 103 for further processing. Display and stroke capture device 102 may comprise one or more components that enable the writings made using a writing instrument to be captured. For example, in an embodiment where a writing instrument that leaves a visible mark on the display surface is used, display and stroke capture device 102 may comprise a camera that is positioned in front of the display surface and configured to capture images of the display surface, where the captured images include the visible marks made on the display surface using a writing instrument. The captured images may then be communicated to stroke matcher 103, which is configured to process the images to determine digital information corresponding to the visible marks made on the display surface.

In another embodiment, display and stroke capture device 102 may comprise one or more sensors that are configured to capture the motion or movement of the writing instrument when the user uses the writing instrument to write. The motion may be captured using different techniques. According to one technique, motion sensors may be placed along the display surface and are capable of capturing the motion of the writing instrument in a 2-dimensional plane (or in three dimensions). The captured motion information may then be conveyed to stroke matcher 103 to process the captured information.

In yet another embodiment, display and stroke capture device 102 may comprise one or more pressure sensors that may be incorporated into the display surface making the display surface pressure sensitive. Such a pressure mapping multi-touch surface can be built from force sensitive resistor material sandwiched between a flexible electronic circuit like those available from TekScan, Inc. in South Boston, Mass. In such an embodiment, the display surface may provide a multi-touch pressure sensing surface that can capture writing information based upon a user's touches on the display surface. In one embodiment, in addition to sensing a user's writing, the pressure sensors may also be able to determine the force with which a user writes on the display surface.

Display and stroke capture device 102 may comprise two or more cameras and IR sources at the edges or corners of the display surface, for example, four cameras and IR sources at the four corners, and may comprise a retro-reflective background around the perimeter of the display surface. The cameras view and the IR sources illuminate parallel to the display surface. Objects (e.g., pens, fingers, fists, etc.) that block the camera view of the reflected IR illumination are detected.

In yet another embodiment, the display surface of display and stroke capture device 102 may be a capacitively-coupled input interface such as a surface found on an Apple iPad™ or iPhone™ device. In such an embodiment, the display surface may enable a multi-touch input experience, zooming and panning capabilities, and the like. In such an embodiment, a user may use a finger or a conductive stylus to write on the display surface and the writings may then be communicated to stroke matcher 103 for processing and analysis.

In order to be able to capture the writings made using a writing instrument, in one embodiment, display and stroke capture device 102 may be communicatively linked with a writing instrument. This link, which may be wired or wireless, enables display and stroke capture device 102 to capture the writings made using the writing instrument.

In one embodiment, display and stroke capture device 102 is configured to determine stroke information based upon the information it captures and then determine digital information corresponding to the stroke information. The stroke information may comprise information related to a collection of time-ordered strokes. In one embodiment, a stroke may correspond to data produced by a writing instrument from the time the writing instrument is engaged (i.e., used for writing) until the writing instrument is disengaged. For example, in one embodiment, a stroke may correspond to data produced by a writing instrument from the time the writing instrument makes contact with the display surface until the contact is interrupted or broken. A stroke may be considered the most fundamental unit used for representing information input by a user using a writing instrument. Each stroke has an associated time component indicative of when the stroke was made. The information input or written by a user using the writing instrument may be represented by a series or set of time-ordered strokes.

In one embodiment, display and stroke capture device 102 receives raw sensor data captured by display and stroke capture device 102 and then determine strokes information based upon the raw data. Alternatively, stroke matcher 103 receives stroke information from a writing capture system. Stroke matcher 103 may then determine digital information corresponding to the stroke information. In some embodiments, the digital information may be determined directly from the raw sensor data. The digital information is such that it reflects the writings made using a writing instrument 114. Display and stroke capture device 102 may then communicate the determined digital information to projector 104 for projection on the display surface.

In one embodiment, a projector (not shown) is configured to project and display information on display the display surface. In one embodiment, the projector receives a signal (e.g., a video signal, an image, etc.) comprising digital information corresponding to writings made using a writing instrument. The projector is configured to project or output the received signal on to the display surface such that the digital information corresponding to the writings is output or displayed on the display surface and made viewable to one or more users of the IWB system. In one embodiment, the digital information corresponding to a writing is projected onto the display surface in such a manner that the digital information is projected in the same location as the writing on the display surface.

In one embodiment, the projector is a short throw projector that is positioned at a short distance in front of the display surface such that it can project the digital information on to the display surface. For example, the projector may be an ultra-short throw projector that is positioned in front of the display surface and projects the information on to the display surface. An example of such a projector is the CP-AW250NM produced by Hitachi, Ltd. Other types of front throw projectors may be used in alternative embodiments. The projector may project in different resolutions including high definition (e.g., 1920×1080) resolutions.

Stroke Matcher

As discussed above, in one embodiment, stroke matcher 103 associates strokes with image data that is associated with a context, referred to herein as a stroke context, and stores stroke data corresponding to the strokes in memory with the stroke context. In one embodiment, each stroke context represents an association between at least one stroke and a portion of image data previously displayed on the display surface. In one embodiment, each stroke is associated with one stroke context. In one embodiment, the stroke context includes one or more of the entire background images) and any associated information from the system sharing the background images (e.g., the device sharing the image, the application running on the device (e.g., PowerPoint), a file name or URL of a document being displayed, a user name, an audio sample of a someone speaking while the stroke is being drawn). In one embodiment, the stroke context includes descriptors of feature points in the image, the coordinates of the stroke relative to those feature points, perhaps the portion of the background image "underneath" the drawn stroke, the time the stroke is drawn, and if shared from a PC, the name of the document or window for the front most application.

More specifically, stroke matcher 103 receives image data associated with a context and determines if the portion the image is the same as, overlaps or is independent of the contexts already stored in the memory. Based on the results of determining if the portion the image is the same as, overlaps or is independent of the contexts already stored in the memory, stroke matcher 103 updates the memory to include the new stroke by adding the new stroke to one of the contexts stored in the memory or stores the new stroke with the first context independent of the contexts already stored in the memory. In one embodiment, stroke matcher 103 adds the new stroke to a context stored in memory with or without feature points based on an amount of feature similarity between the new image content and an image associated with the context already stored in memory. In another embodiment, stroke matcher 103 adds the new stroke to the previously stored context without adding feature points if the context associated with the new image and previously stored context are the same. In yet another embodiment, stroke matcher 103 adds the new stroke to the previously stored context with only one or more feature points associated with a portion of the new image that does not overlap an image associated with the previously stored context. In one embodiment, if the current image matches image data of a previously stored context, for example by having 95% of the feature match, a new stroke context is not generated.

Stroke matcher 103 also receives image requests and determines whether the image data corresponding to those image requests have part of contexts already stored in memory. In other words, stroke matcher 103 determines if new content (e.g., new image data) to be displayed is associated with a stroke context already stored in the memory. In one embodiment, an image matching operation may be performed (as opposed to a feature space match) to avoid placing stroke on wrong "window". If stroke matcher 103 determines that the new content (e.g., new image data) to be displayed is associated with a stroke context already stored in the memory, stroke matcher 103 returns information identifying any strokes of the stroke context stored in memory that is associated with that content and transformation information to enable those strokes to be transformed for display on the display surface over that new content. In one embodiment, stroke matcher 103 returns associated stroke information (e.g., a stroke ID for each of the strokes) corresponding to strokes that may be been previously written on the image data and transformation information that indicates how to transform the stroke information to enable any of the corresponding strokes to be recreated and displayed with the image data on the display surface. In one embodiment, display and stroke capture device 102 keeps track of the strokes, and stroke matcher 103 only needs to return a list of stroke IDs and a transformation for each stroke into the new image coordinates. In one embodiment, the transformation is a perspective transformation, although some applications only support affine or more limited transformation. In another embodiment, the transformation includes a translation, scaling, rotation and/or skew. In another embodiment, display and stroke capture device 102 does not keep track of strokes, and stroke matcher 103 saves stroke images, transforms them, and returns the transformed image along with the coordinates for pasting the stroke. In one embodiment, some format supporting transparency is used (e.g., png). In yet another embodiment, the matcher does not return any "features"; it merely returns a transformation into the coordinate system of the query image.

In one embodiment, stroke matcher 103 includes a common computer vision pipeline that includes keypoint detection, feature extraction and matching. In one embodiment, these techniques are designed for screen sharing markup sessions associated with the use of whiteboard and similar technologies where background contexts (e.g., images) for a large number of strokes are created, context groups are created for scrolled images, rapid stroke addition and retrieval are used, as well as verification techniques for screen images.

Figure 2:
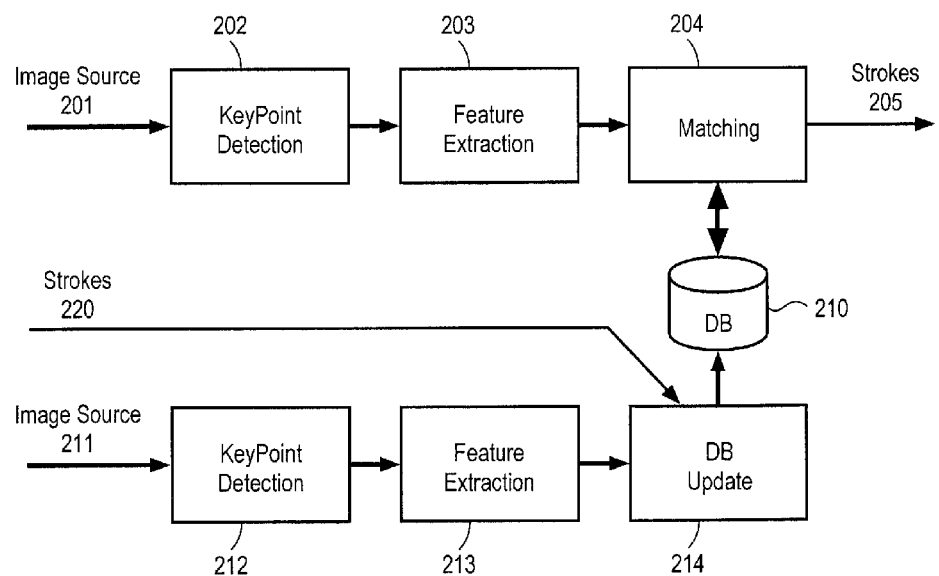
FIG. 2 illustrates one embodiment of a stroke matcher.

FIG. 2 illustrates one embodiment of a stroke matcher. Referring to FIG. 2, one or more images from image source 201 are received by stroke matcher 103. In response thereto, keypoint detection module 202 performs keypoint detection in a manner well-known in the art to identify keypoints in the images. After performing keypoint detection, feature extraction module 203 performs feature extraction in a manner well-known in the art to determine descriptors for each of the detected keypoints. Using the determined descriptors, matching module 204 finds matches between the descriptors of received images from image source 201 with previous images stored in memory 210 (e.g., a database). In one embodiment, matching module 204 performs a selection algorithm to select a group of consistent matches. In one embodiment, individual matches are found based on a distance measure appropriate to the descriptor. For example, a continuous distance measure for continuous features or Hamming distance may be used for binary features. In one embodiment, groups of consistent matches are determined by the RANSAC algorithm. If matching module 204 identifies a portion (e.g., a threshold portion such as 95%) or all of a previous image that matches a corresponding portion or all of the image from image source 201, then any previous strokes made to the matching portion are transformed to fit the new image from image source 201 when the new image is displayed.

Figure 3:
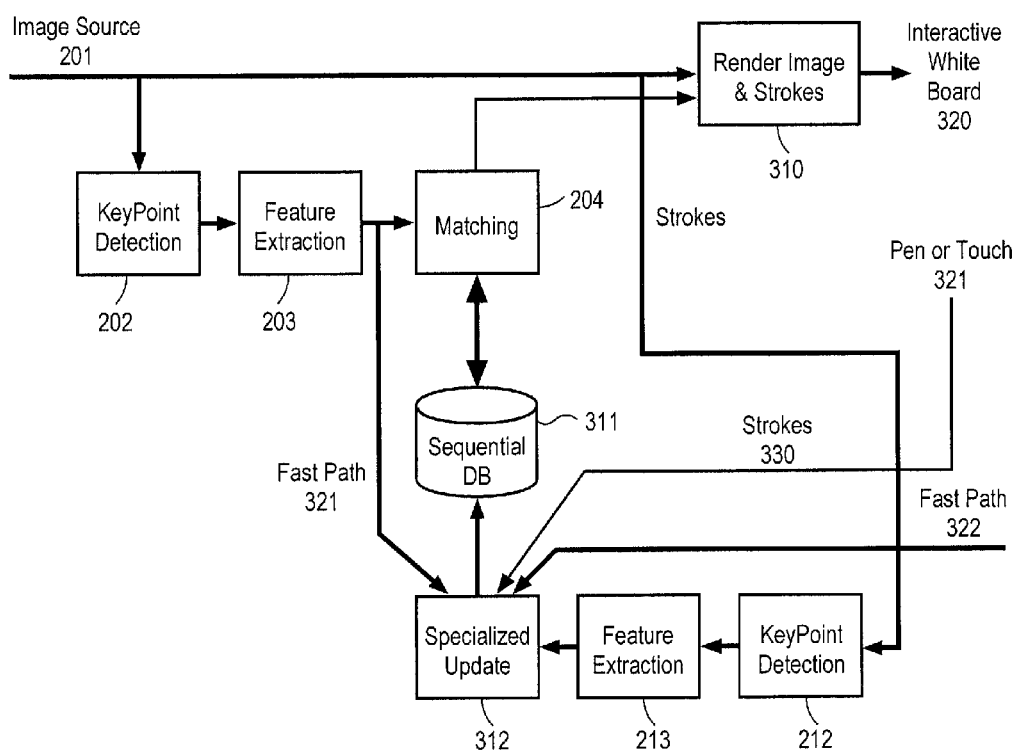
FIG. 3 is a block diagram of one embodiment of a whiteboard system.

Note that the previous images stored in memory 210 were stored after being received from image source 211, which may be the same as image source 201, and undergoing keypoint detection by module 212, feature extraction by module 213, and an update operation performed by module 214. The update operation performed by module 214 includes associating strokes 220, which are received from user input with respect to the display, with the images upon which they are written on the display surface. In one embodiment, each stroke is associated with only a single stroke content (i.e., background image), and when a new stroke is made on a background image, the update operation tests whether that new stroke is on the same stroke context (e.g., the same background image to which a preceding stroke was associated), an overlapping stroke context (e.g., on a background image that partially overlaps at least a portion of a previously displayed image), or an independent stroke context (e.g., a new background image). If it is determined that a newly added stroke is to the same context, stroke information that defines the stroke (e.g., a stroke ID, a stroke image, or a set of points to be drawn to render the stroke) is added to that existing stroke context, no new feature points are added for matching as the stroke is added to that existing stroke context. If it is determined that the newly added stroke has been added to a stroke context (background image) that overlaps at least a portion of a previous context (a previously display background image), then the stroke information that defines the stroke is added to that existing stroke context but only some feature points associated with the non-overlapping portion of the current background image are added. FIG. 3 is a block diagram of a system that performs this functionality.

Referring to FIG. 3, the system includes the computer vision pipeline comprising keypoint detection module 202, feature extraction module 203, and matching module 204, which operate the same as the corresponding modules in FIG. 2. Matching module 204 generates strokes that are rendered along with the image from image source 201 onto the display surface of the interactive whiteboard 320 using rendering module 310.

The system also includes keypoint detection module 212, feature extraction module 213, which operate the same as the corresponding modules in FIG. 2. Keypoint detection module 212 receives images from image source 201. Update module 312 updates memory 311 (e.g., a sequential database) based on features extracted by feature extraction module 213, strokes 330 from a pen or touching (321) interactive white board 320. Update module 312 also receives features extracted by feature extraction module 203 on fast path 321. Similarly, fast path 322 also provides inputs to update module 312. The point of path 321 is that the features are computed for matching and don't have to be recomputed if a stroke is drawn on the same background image. Fast path 322 could be used to get the background image used to check if the stroke is later being used on an equivalent background.

In one embodiment, when a new stroke is received, the system determines if it overlaps with any stroke(s) that are already part of the stroke context (i.e., already associated with an image, an overlapping stroke context (e.g., on a background image that partially overlaps at least a portion of a previously displayed image), or an independent stroke context (e.g., a new background image). If it is determined that a newly added stroke is to the same context, no new feature points are added for matching and the stroke is added to that existing stroke context. This information is conveyed to the update module 312 via fast path 322. If it is determined that the newly added stroke has been added to a context (background image) that overlaps at least a portion of a previous context (a previously display background image), then only some feature points associated with the non-overlapping portion of the current background image are received by update module 312 via fast path 321 and added to the stroke context for the image.

In one embodiment, keypoint detection is used to find locations in an image that are likely to be able to be found if the image is captured again under different conditions (e.g., a different shift, scale, or illumination, etc.). The results of performing keypoint detection is that multiple images may be identified which are candidates to match an image that is to be displayed. There are a number of well-known methods of finding keypoints, including those to find corners (sharp changes in more than one dimension) or regions (area with constant or linearly changing color), such as, for example, Harris/Stephen Corner (1988), GFTT (1994), SIFT (1999), MSER (2002), ORB (2011). See also U.S. Pat. No. 8,504,624 and U.S. Application Publication Nos. 2012/0229425 and 20100251106.

For more information, see Harris, Chris, and Mike Stephens, "A combined corner and edge detector" *Alvey vision conference*. Vol. 15. 1988; Shi, Jianbo, and Carlo Tomasi. "Good features to track." *Computer Vision and Pattern Recognition*, 1994. *Proceedings CVPR '94, 1994 IEEE Computer Society Conference on*. IEEE, 1994; and Ethan Rublee, Vincent Rabaud, Kurt Konolige, Gary R. Bradski: ORB: An efficient alternative to SIFT or SURF. ICCV 2011: 2564-2571.

In one embodiment, the "ORB" keypoint detector is from OpenCV is used. In ORB, keypoints are identified by finding maximums between a central point and a ring of pixels some distances from that point. The image is scaled to multiple sizes and the detector rerun to allow for finding the same keypoints across images. To obtain a particular number of keypoints, a low threshold for the difference is set and then points are sorted based on a Harris corner measure. In one embodiment, the keypoint detection finds points at the beginning and ends of words and figures and some points within the imagery as well.

After the keypoint detection algorithm finds keypoints in an image, the feature extraction module generates a description of the keypoint so that it can be matched it if appears in another image. In one embodiment, a gradient or moment or distance is computed and normalized to the largest value at that point to account for changes in the capture process. In one embodiment, multiple values are typically computed so that each feature extracted might be a 64 dimensional vector, e.g.

$$X1 = [x1, x2, x3, x4 \ldots x64]$$
$$X2 = [x1, x2, x3, x4, \ldots x64]$$
$$\ldots$$
$$X200 = [x1, x2, x3, x4, \ldots x64]$$

In one embodiment, features are a vector of scalar values. In another embodiment, features are a much larger vector of binary values. The vector might describe color, local gradients, areas, moments, and/or distances to other keypoints.

In one embodiment, OpenCVs ORB feature extractor is used for feature extraction. In ORB, the feature extractor smooths a patch around the detected keypoint and then performs a binary comparison for several pairs of pixels in the smoothed patch. In one embodiment, the feature vector consists only of ones and zeros and is compactly represented. In one embodiment, distance between two feature points is measured by the number of bits that are different (Hamming Distance). The ORB feature extractor matches features at different rotations by rotating the patch to some maximum value of the orientation of the keypoint. In one embodiment, for computational efficiency, the coordinates of points used for the comparison can be pre-computed for multiple orientations and the correct set of coordinates used for each keypoint.

In one embodiment, there will be several images with strokes associated with them and a current image that is to be displayed for which a determination needs to be made as to whether previously drawn strokes should be drawn on it. Using the features determined for the previous images and those determined for the image to be displayed, matches are found between the image features of the image to be displayed and the images with which strokes have been associated in the past. Because there can be hundreds of feature points per image and each point might be described by a 64 dimensional vector, this matching operation can be extremely computationally complex. In one embodiment, a distance measure is used that is appropriate to the type of feature vector. For example, when using in one embodiment, matching is via brute force to allow for fast indexing. In another embodiment, matching is done via a well-known tree-based matcher. Brute force matching makes it easy to add additional images, which is important as new strokes can be associated with imagery throughout the meeting, but brute force matching takes longer as the number of strokes increases. Tree structures can be used which make the matching faster, but updating the tree structure with new strokes can take a long time.

In one embodiment, extracted features of the image to be displayed are matched against all the previously saved feature points. In one embodiment, the matching logic uses this matching operation multiple times to find more than one match between a new image to be displayed and a stroke context.

Since the ORB features are binary, the matching operation involves performing an exclusive-or (XOR) operation and counting the number of "1" bits after the match. In another matching technology, a "locally sensitive hashing" method can be used. This allows far fewer matching operations to be done, but does not always find the nearest neighbor. The "locally sensitive hash" method allows much larger data sets to be searched, but adding a new background image will take longer.

That is, in one embodiment, the stroke matcher searches recently matched stroke contexts first to increase the likelihood of finding a match quickly. The number of stroke contexts considered recent may be based on the time (e.g., within last 10 minutes) or number (e.g., the last 3 stroke contexts). If most of the feature points are matched, then a search for additional matches is not performed. If, however, a large number of points are not matched, a search for additional matches can continue.

In one embodiment, the stroke matcher uses sequence information associated with a sequence in which images were displayed as part of determining if a match exists. This is because very often strokes are rapidly added to the same background image.

In one embodiment, contexts are grouped to be searched more quickly. In other words, strokes with different feature points, but which have appeared together are placed in a "context group" feature points within a context group are searched before a general search is done, and if the context group is sufficient to find a match with the feature points corresponding to the image being searched, it is unnecessary to search all the feature points, which could be slow.

In one embodiment, the matching module compares the new content with a set of stroke contexts with known transformations before searching other stroke contexts stored in the memory when determining if the new content matches at least partially with one or more stroke contexts stored in the memory. In one embodiment, multiple transformations between the new content and stored stroke contexts are used as part of determining if a match exists at least partially with the one stroke context. For example, there may be multiple transformations found between a "query" image and a stroke context in certain terms, such as, for instance, when a web page is being viewed and the header stays the same and the body is scrolled. In such a case, the matching feature points will have one transformation for the header and a different one for the body. In this case, the background image upon which the original stroke was drawn can be transformed under the two transformations and determination made as to whether it still matches. In one embodiment, the matching module eliminates at least one transformation based on one or more selected from a group consisting of type and image comparison.

Once the matching is done, the query image may have features that match with multiple different images. Some of these matches are accurate matches and many of which are not, either because of noise or because one small part of the image looks like a small part of another image. In one embodiment, to find consistent matches, an algorithm is used (e.g., RANSAC which is an acronym for "RANdom SAmple Consensus") to find the best set of consistent matches by randomly guessing that some matches may be "outliers" and then testing the remaining features for consistency. That is, the points from the initial match are removed and RANSAC is used again to see if there is another set of matching points with a different mapping.

Once a set of inliers is determined, the mapping between these points can be used to determine the transform between the new image to be displayed and the original, previous images associated with strokes. Using this transformation, the original images are transformed onto the new image and a sanity check is made to determine if the match is reasonable. If the match is reasonable, then the stroke IDs associated with the image, along with the transformation are returned to the application. To ensure transformations are consistent with screen capture, four matching points can be used to determine a perspective transformation from one image to another, all the consistent matching points are taken to that can be used to transform the stroke and write it on top. In one embodiment, the system takes the image data underneath where the stroke was drawn, transforms it, and compares it with the background image where the image was originally drawn.

User Experience

Prior whiteboard systems do not include a user interface that provides a positive user experience. Users often want to keep track of the images upon which they have added markups. For example, as a user is using the whiteboard and marking up content, the user would like to keep their strokes with the old content even if the content has changed. However, the prior art systems require a user who is controlling the content that is being displayed by the IWB to return to the page onto which the strokes were drawn and then the IWB user can save the page with image and strokes together. Thereafter, the user controlling the supply of content to the IWB system can change to a new page, and the IWB user can delete strokes and begin to mark up the next page.

To avoid this experience, the IWB system captures the markup and creates pages automatically based on groups of strokes. Furthermore, the IWB system adds, upon creation, strokes to previously prepared pages with the same content. Moreover, the IWB system uses a user interface that allows a user to switch between screens that display the current content to those that have previously generated pages of content upon which strokes were added. In one embodiment the Thus, when the user changes that content, the old strokes would disappear and the IWB user could immediately add strokes, while if the image provided went to the old page, or a related page, the related strokes drawn by the IWB user would appear.

In one embodiment, the method comprises receiving first content for display on a display surface, displaying the first content at a first area of the display surface, capturing a stroke when written on the display surface over a first portion of the first content and automatically creating a first page at a second area of the display surface, the second area being different than the first area and displaying the first content with the captured stroke. In another embodiment, automatically creating the first page at the second area of the display surface occurs if a page does not already exist with the first content.

In yet another embodiment, the method further comprises adding the stroke to one or more other pages already displaying at least a portion of the first content that overlaps the first portion upon which the stroke was added.

In still yet another embodiment, the method further comprises adding one or more additional strokes for display on the display surface with the first content if a matching service indicates the one or more additional strokes were previously displayed on the first content.

In one embodiment, the method further comprises causing the first area of the display surface to display a previously generated page that is currently displayed in another area of the display surface. In another embodiment, the first area of the display area is the active area of the display screen upon which a user may add strokes.

In one embodiment, the method further comprises sending the first content to a matching service to determine if a stroke context exists for the first content, receiving second content for display on the display service, and determining whether to send the second content to the matching service based on whether a response has been received from the matching service with respect to whether a stroke context exists for the first content. In another embodiment, that method further comprises generating strokes for display on the display surface with the first content if the matching service indicates a stroke context exists for the first content, and sending the second content to the matching service if the matching service indicates a stroke context exists for the first content prior to determining whether to send the second content to the matching service. In yet another embodiment, that method further comprises delaying the second content from being sent to the matching service until the matching service indicates whether or not a stroke context exists for the first content.

Figure 4:
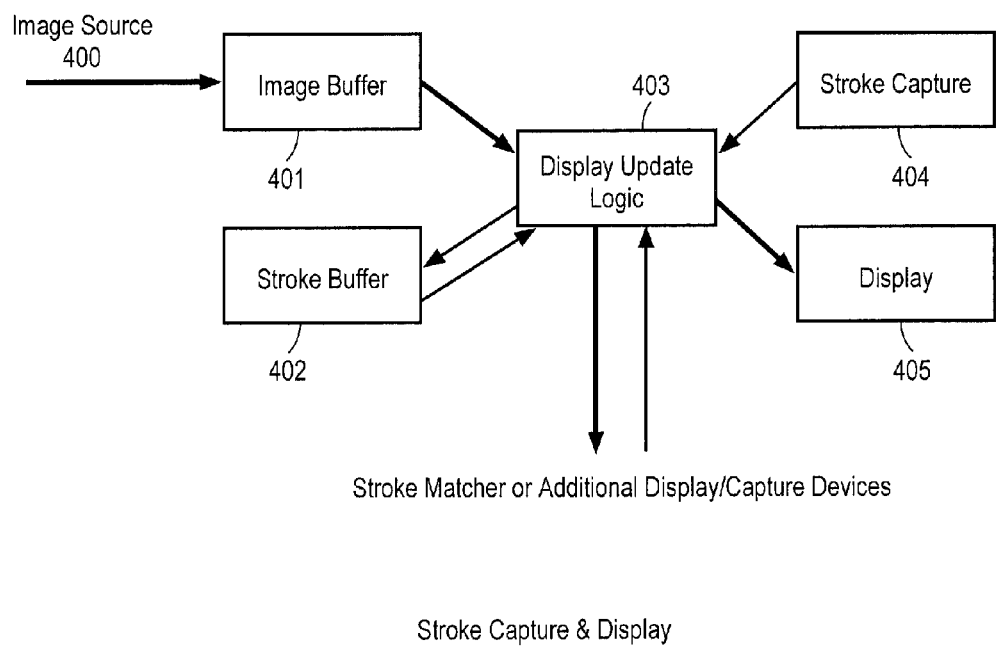
FIG. 4 is a block diagram of one embodiment for the display and stroke capture unit of FIG. 1.

FIG. 4 is a block diagram of one embodiment for the display and stroke capture unit 102 of FIG. 1. Referring to FIG. 4, image source 400 (e.g., image source 101 of FIG. 1) provides an image that is buffered in image buffer 401. Stroke buffer 402 stores one or more strokes. These strokes are stored in stroke buffer 402 via display update logic 403. Display update logic 403 may obtain the strokes from a stroke matcher (e.g., stroke matcher 103), stroke capture unit 404, and/or additional display and/or capture device. Display update logic 403 also receives the buffered image from image buffer 401 and strokes from stroke buffer 402 and renders the image onto display 405.

In one embodiment, using a stroke identifier (ID) and an image, the display update logic 403 adds the association between a stroke and the image into a database (or other storage such as storage 210). In one embodiment, this is performed using an associate( ) function that takes an image and a stroke ID and a bounding box for the stroke and adds these to the database of strokes to search.

In one embodiment, given a background image to be displayed, display update logic 403 uses a function to return a list of stroke IDs and the transforms. The display update logic calls the matcher with an image, and the matcher returns strokes that match. The display logic transforms the returned strokes from the old coordinate system to the coordinate system of the background image to be displayed. In one embodiment, this transform could be different for each stroke. The transform may be a simple translation (x,y) offset. In general, the transform is a perspective translation that can incorporate translation, scale, rotation, skew and shear them to map strokes to the new background image. In one embodiment, display update logic 403 uses a function to save current stroke-image associations into memory (e.g., a database). In another embodiment, display update logic 403 uses a function to update the database to no longer return a particular stroke ID (i.e., to remove a stroke).

In one embodiment, the user interface of the IWB displays the current background image along with one or more previously displayed images that include rendered strokes. These previously displayed images were each previously displayed as the current, or live background image and strokes were applied thereto. Thereafter, when a new background image is displayed as the current ("live") image which does not have a stroke context, the previous background image with its stroke context is displayed at another location on the whiteboard display surface. This may be, for example, along the bottom of the whiteboard display or beneath the current background image on the whiteboard display. One or more pages of previously displayed background images with stroke contexts may be displayed in different windows on the display surface along with the current ("live") image.

Figure 5:
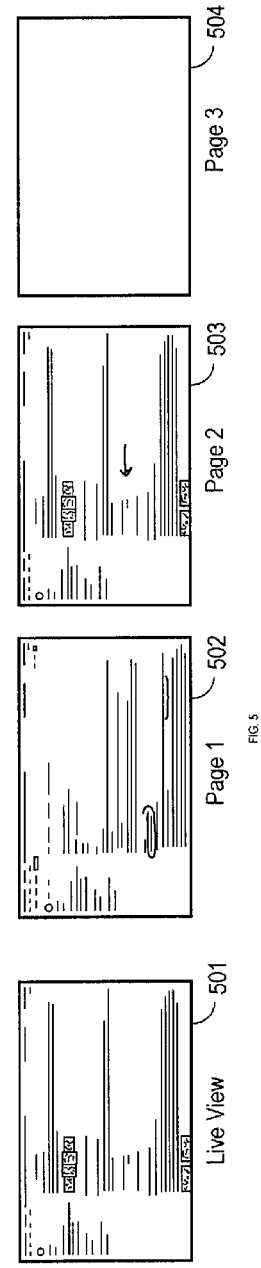
FIG. 5 illustrates an example of a user interface of the whiteboard system.

FIG. 5 illustrates an example of a user interface of the whiteboard system. Referring to FIG. 5, display window 500 is the main display window and displays the image with associated strokes, if any, of one of the pages displayed below it, such as live view 501 representing the currently displayed image coming from the image source, or one or more previously displayed images with their associated strokes that are shown in windows 502-504.

While displaying the live view page 501 in display window 500, if the user wants to redisplay a previously displayed page with its strokes, the user selects one of pages 502-504 on the display. This selection may be accomplished by moving a cursor over the image and engaging the cursor control device (e.g., depressing a button on the cursor control device) to indicate the whiteboard that the page has been selected or by tapping on the whiteboard over the image.

Furthermore, in one embodiment, if the new background image being displayed includes content that is also part of one or more of the previously displayed pages that remain displayed with their stroke context, then any stroke(s) made to area of the new background image that is part of one or more of the previously displayed pages is added to the previously displayed pages. For example, when strokes 510 and 511 are created with the live view page being displayed in display window 500, the image in page 502 includes that portion of the image in display window 500 on which strokes 510 and 511 were created. Therefore, in one embodiment, the display update logic of the system adds those two strokes to the image in page 502 automatically.

Stroke Update Delay

There are several items that contribute to the appearance of synchronization between the strokes that the system manages and the background images. These include the arrival rate of background images, the delay before starting a "find( )" operation to determine the strokes that should go on the background image, the delay updating the strokes, and the delay updating the background image. When a background image is to be displayed on the whiteboard and the system determines whether there are any strokes associated with the background image to display along with the background image, and if so obtains those strokes for display along with the background image on the whiteboard. If the rate at which those strokes can be obtained and incorporated into the display with the background image is slower than the rate at which the new background images are being received from the image source for display, then the strokes being displayed may not be in sync with their associated background image on the display.

Figure 6:
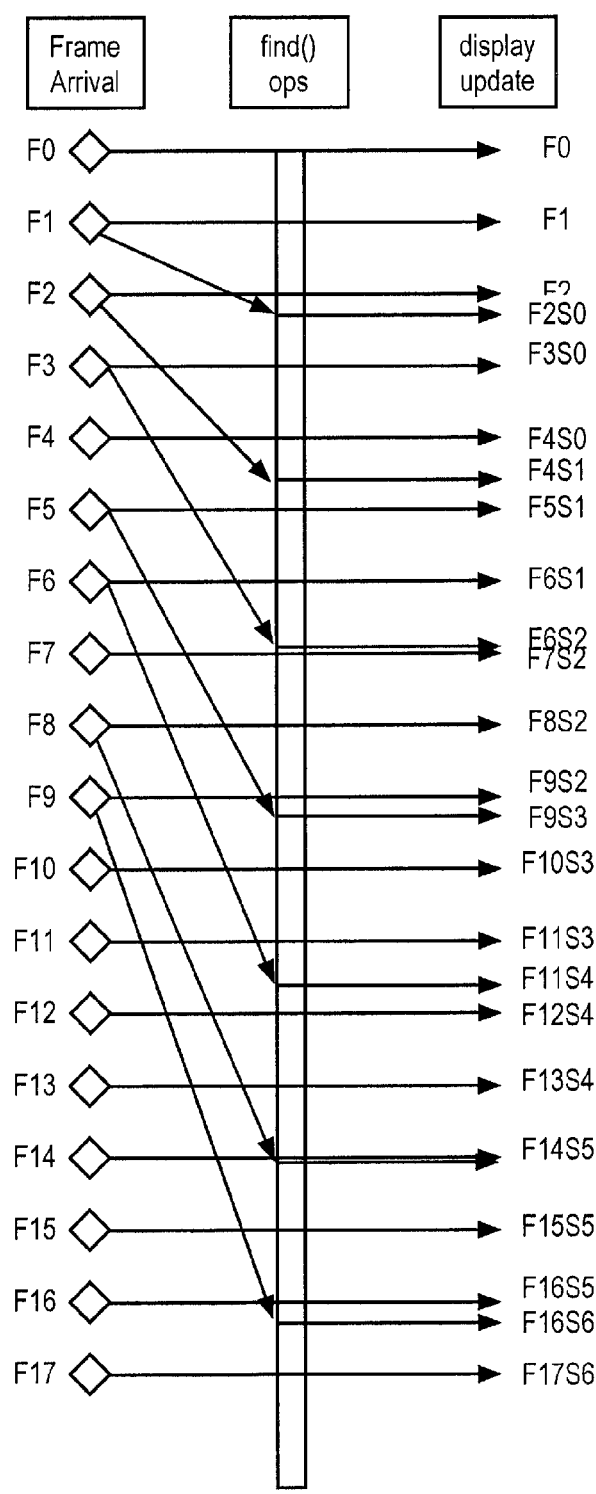
FIG. 6 illustrates a worst case situation occurs if an operation to obtain strokes based on a matching operation occurs for every screen arrival and computation takes longer than the interval between the arrival of additional screens.

FIG. 6 illustrates a worst case situation occurs if a find( ) operation to obtain strokes based on a matching operation occurs for every screen arrival, but the find( ) operation takes longer than the arrival. Referring to FIG. 6, in this case, the delay between the strokes and the background image becomes longer as time goes on, and very rapidly there appears to be no association between the strokes and the images. The bottom of FIG. 6 shows that Frame 17 is being displayed with the strokes from Frame 6 "F17S6".

There are a number of ways to improve this lack of synchronization. In one embodiment, a system and method for associating strokes with image data is disclosed. In one embodiment, the system comprises a display surface, a memory, a stroke capture module, a matching module and a display update module. In one embodiment, the memory is coupled to the display surface and stores stroke contexts (e.g., background images) for a plurality of strokes, where each stroke context represents an association between at least one stroke and a portion of image data previously displayed. The stroke capture module is operable with the display surface and communicably coupled with the memory to capture one or more strokes written on the display surface and associate captured stroke data corresponding to the one or more strokes with content to create a new stroke context. The stroke capture module causes the new stroke context to be stored in the memory.

The matching module operates with the display surface and is responsive to a first content being received to determine if that first content is associated with one stroke context stored in the memory and to return information identifying one or more strokes of the one stroke context associated with that first content and transformation information to transform the one or more strokes of the one stroke context for display on the display surface over that first content. In one embodiment, the matching service performs keypoint detection, feature extraction, and matching to determine if the first content is associated with a stroke context. The display update logic sends the first content to the matching service to determine if strokes exists for that content and determines whether to send second content, received after the first content, to the matching service based on whether a response from the matching service with respect to whether a stroke exists for the first content has been received.

In one embodiment, the method performed by the system comprises receiving first content for display on a display surface, sending the first content to a matching service to determine if one or more strokes exists for the first content, receiving second content for display on the display service, and determining whether to send the second content to the matching service based on whether a response from the matching service with respect to results have been received from the previous matching request. In one embodiment, the method further comprises generating strokes for display on the display surface with the first content if the matching service indicates a strokes match the first content, and sending the second content to the matching service if the matching service indicates a stroke context exists for the first content prior to determining whether to send the second content to the matching service.

In one embodiment, the method further comprises delaying the second content from being sent to the matching service until the matching service indicates whether or not a stroke context exists for the first content. In another embodiment, the method further comprises receiving third content for display on the display surface, and determining not to send the second content to the matching service if the third content is received prior to receiving the response from the matching service with respect to whether a stroke context exists for the first content. In yet another embodiment, the method further comprises sending the third content to the matching service to determine if a stroke context exists for the third content.

Figure 7:
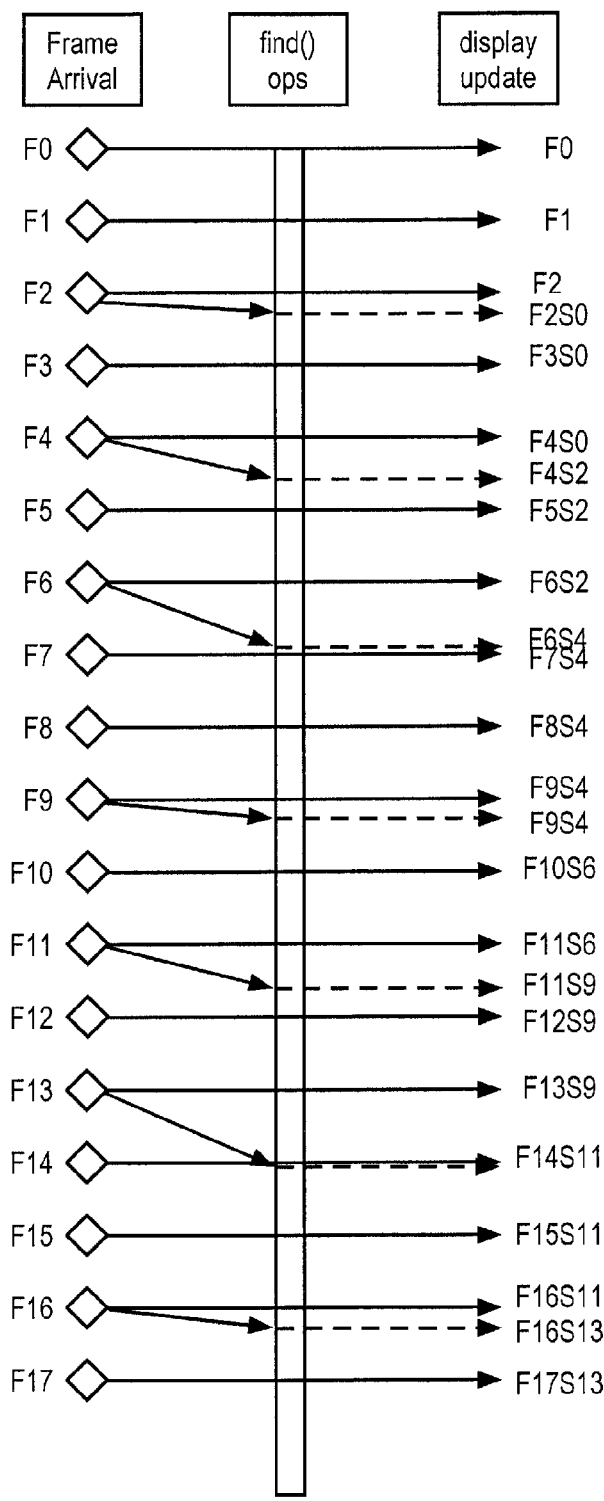
FIG. 7 illustrates the dropping of the operation to find strokes for any screen when a more recent screen has arrived and the delay between the displayed strokes and the correct background image will be only slightly larger than the time for one such operation.
Figure 8:
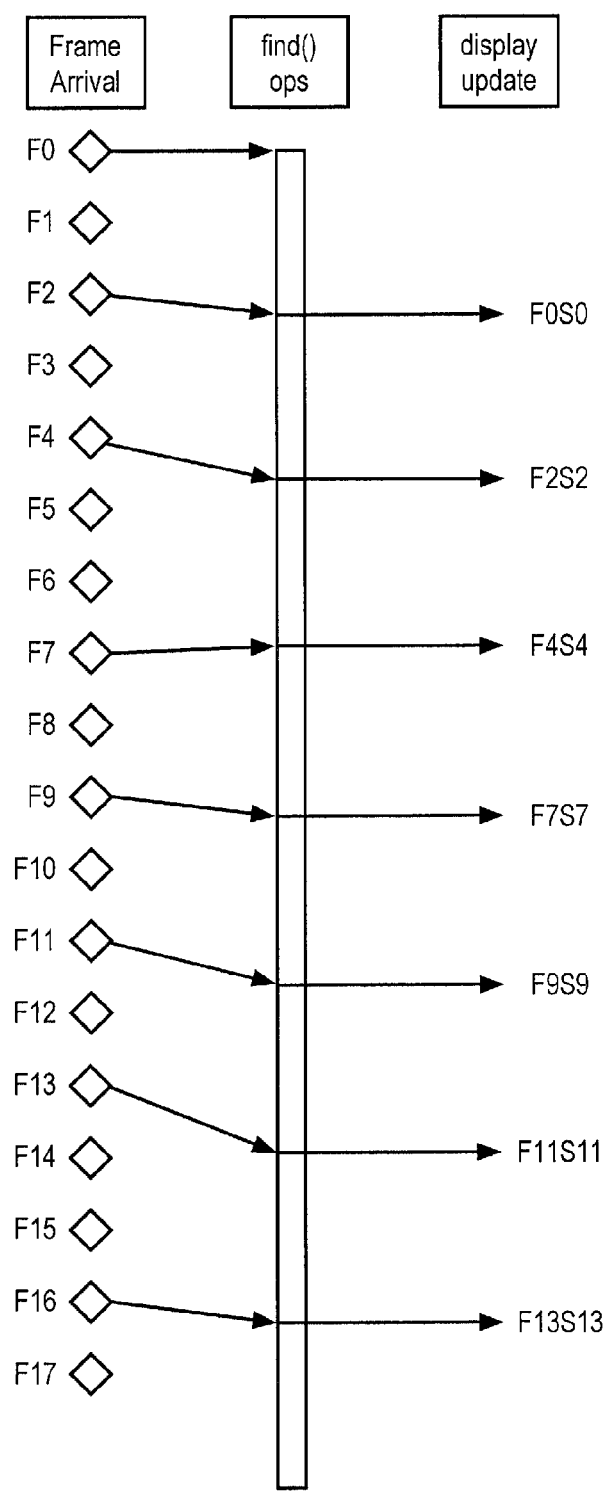
FIG. 8 illustrates delaying the display of a frame until the strokes matching that frame have been determined, and only showing frames with matched strokes.

More specifically, in one embodiment, when a new background image has been input and/or received for display, the whiteboard determines whether or not it has received the results of checking for strokes associated with the previous background image. If not, then the whiteboard does not send a request for strokes for the new background image. FIGS. 7 and 8 show two methods of maintaining better synchronization. FIG. 7 basically always shows the latest strokes that have been returned, and always shows the latest image received, but does not submit a new image until the results from the previous image have been received. Specifically, in FIG. 7, dropping of the find( ) operation for any screen when a more recent screen has arrived compensates for the delay between strokes and the correct background image so that the delay will be only slightly larger than the time for one find( ) operation. When a new image is submitted the most recent image available is used. This means some frames (images) are never used.

"Stroke Contexts" are internal to the matching system and just a convenience for speeding things up and improving matching. From the point of view of the display unit, it sends content and a stroke ID, and it receives strokes and a stroke transform, it never receives a "stroke context". In FIG. 7, Frames 0, 2, 4, 6, 9, 11, and 13 are submitted, Frames 1, 3, 5, 7, 8, 10, and 12 are never submitted for display but they do appear with the most recent strokes returned.

In FIG. 8, a frame is submitted and only when the associated strokes are received is the frame displayed. This means the strokes are always exactly in synchronization with the frame displayed, but there is delay between when the frame is received and when it is displayed (so if someone can see both the whiteboard and the PC sharing a screen they might notice the delay.) Also in FIG. 8, those frames that aren't submitted for matching are never displayed (and thus the display frame rate is lower than the input frame rate, which may appear a little jerky).

Another alternative is to delay the frames, but maintain the frame rate. In such a case, Frame 0 would be displayed after the strokes are received, while Frame 1 will be delayed exactly the same amount of time as Frame 0, and then displayed with the same strokes. This results in smooth background updates, strokes in close synchronization but the strokes updating at a slower frame rate.

In another embodiment, the frames are not sent to the display immediately upon receipt, and instead are delayed until the matching has been performed and a determination is made as to which strokes, if any, are to be displayed along with the frame. Thus, as soon as the whiteboard receives a background image for display, the stroke sharing service is sent a request to determine if any strokes are associated with the background image and the background image is buffered until such time as the stroke sharing service returns the results of the request. In this manner, the strokes remain in synch with the display of their associated background image as long as the frame update rate occurs at the speed (or less) of the find stroke operation.

To improve the synchronization even more, the display of the frame can be delayed until the find( ) operation has completed. In this case the strokes will always be in perfect synchronization with the background image. The downside of this approach is that the update frame rate will be slower (the rate of completed find( ) operations), and there will be delay between when the source of the background image updates. In many cases, the background image delay will not be an issue especially if the source is remote and thus is already delayed and cannot be seen for comparison.

Summarization

In one embodiment, a user is able to obtain a summary of their session using the IWB system. In one embodiment, the summary contains one or more pages containing every stroke that was made to background images during the session.

A method and apparatus for generating the summary are disclosed. In one embodiment, the system comprises a display surface, a memory, a stroke capture module and a summarization unit. The memory is coupled to the display surface to store stroke contexts for multiple strokes, where each stroke context (e.g., background image) represents an association between at least one stroke and a portion of image data (content) previously displayed. The stroke capture module operates with the display surface and is communicably coupled with the memory to capture one or more strokes written over image data presented on the display surface.

Figure 9:
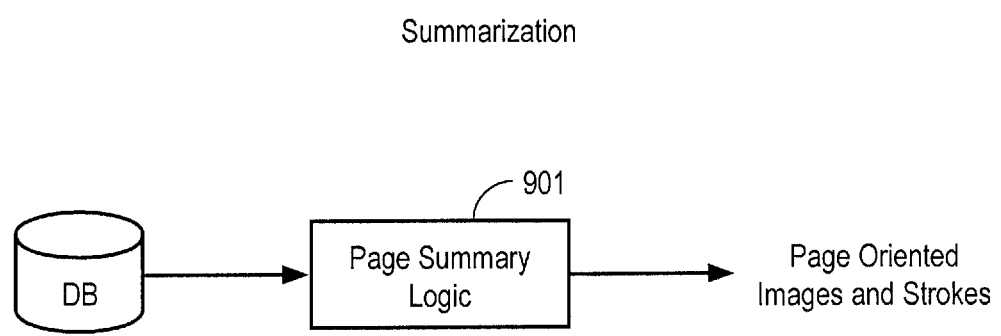
FIG. 9 illustrates the generation of a summary of strokes matched with images.

The summarization unit is coupled to the memory to generate a summary of a session based on content displayed during the session containing one or more strokes made during the session. FIG. 9 illustrates page summary logic 901 coupled to a memory (e.g., database) and acts as a summarization unit to generate page oriented images and strokes. In one embodiment, the summarization unit is operable to generate the summary by: a) accessing the memory to obtain stroke data corresponding a first stroke that is not part of a summary page, where the first stroke is associated with first image data; b) accessing the memory to obtain stroke data corresponding to any other stroke that is associated with the first image data; c) forming a first summary page with the first stroke and any other stroke associated with first image data; and d) repeating a)-c) for another stroke that is not part of a summary page. In one embodiment, the summarization unit is also operable to generate the summary by e) repeating d) until all strokes have been included in at least one summary page.

In one embodiment, the summarization unit selects content for the summary based on user strokes. In one embodiment, the summary is based on strokes automatically matched with content. In one embodiment, the summary contains an output containing all strokes that occurred at least once. In one embodiment, the summary is generated as the system, and its whiteboard (display surface) are being used. In one embodiment, the summary comprises a plurality of pages that are currently displayed in one or more windows (e.g., the user interface of FIG. 5) on the display surface.

Figure 10:
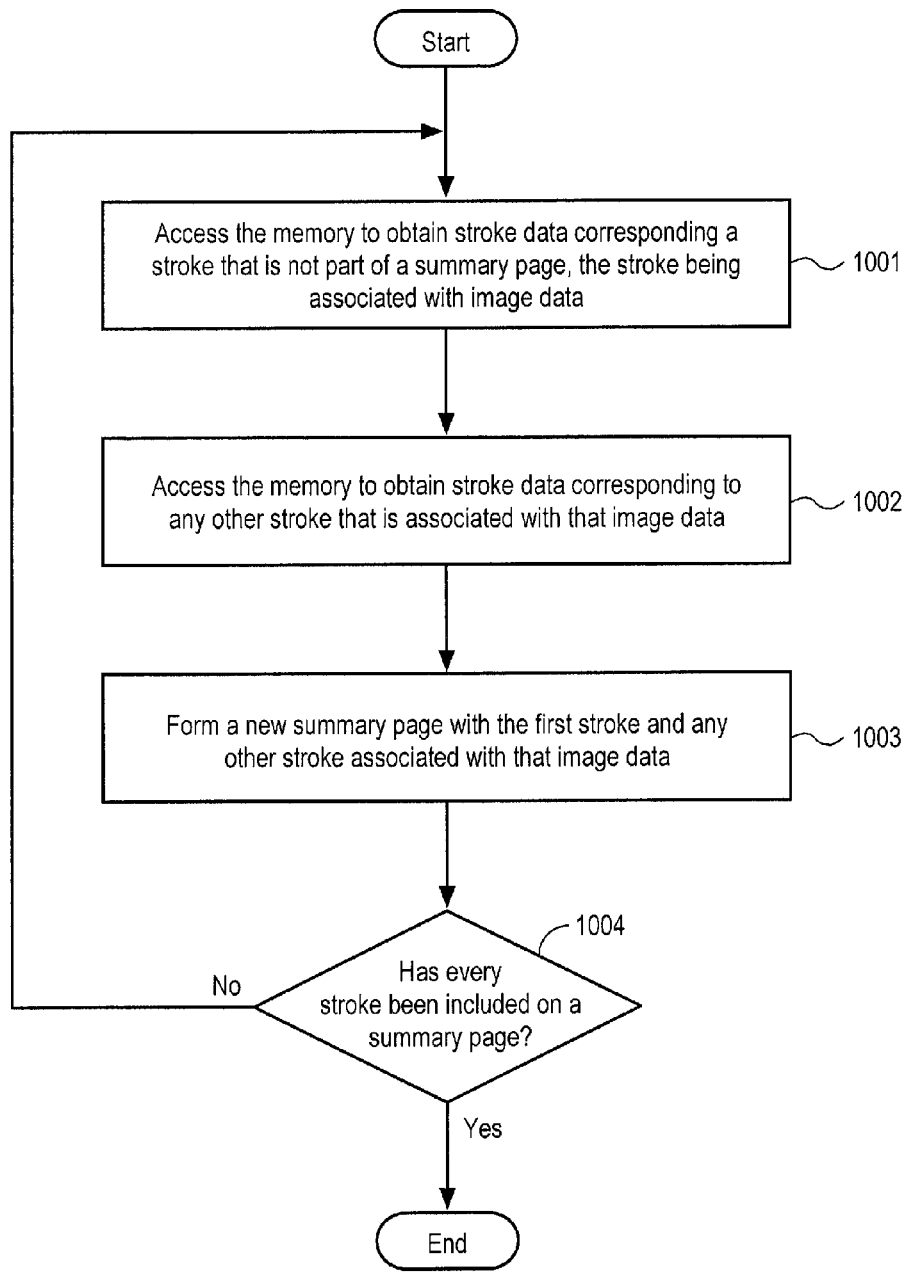
FIG. 10 is a flow diagram of one embodiment of a process for generating one or more summarization pages.

In one embodiment, the method comprises capturing one or more strokes written over content being shown on the display surface; and associating captured stroke data corresponding to the one or more strokes with the content over which they are written to create stroke contexts, where each stroke context represents an association between at least one stroke and a portion of content previously displayed on a display surface; storing stroke contexts for the one or more strokes in a memory; and generating a summary of a session based on content displayed during the session containing one or more strokes made during the session. FIG. 10 is a flow diagram of one embodiment of the process. The process is performed by processing logic that may comprise hardware (circuitry, dedicated logic, etc.), software (such as is run on a general purpose computer system or a dedicated machine), or a combination of both. Referring to FIG. 10, generating the summary comprises: a) accessing the memory to obtain stroke data corresponding a first stroke that is not part of a summary page, the first stroke being associated with first image data (1001); b) accessing the memory to obtain stroke data corresponding to any other stroke that is associated with the first image data (1002); c) forming a first summary page with the first stroke and any other stroke associated with first image data (1003); and d) repeating a)-c) for another stroke that is not part of a summary page (1004). In another embodiment, the method further comprises e) repeating d) until all strokes have been included in at least one summary page.

In one embodiment, a greedy algorithm is run by the summarization unit to create a set of one or more summary pages. The greedy algorithm begins with a set of strokes in the database and none of the strokes are in a summary page. The algorithm obtains a first stroke and identifies the background image to which is it associated. In one embodiment, the database stores at least some images associated with strokes to support the identification. Once it identifies the background image, the algorithm accesses the database and obtains all the other strokes that are associated with that background image. In one embodiment, this algorithm uses the background image as a "query" and determines the strokes and transformation for those strokes (as a display unit would do). The algorithm incorporates all of the strokes that are associated with the identified background image onto the background image to create the first summary page. Thus, the summary page represents a composition of the background image and the strokes. The summary page may optionally be printed by itself and/or with other summary pages. The summary page may also be transferred and/or stored in a more long term storage than the memory used to create it. Note that this next summary page could include one or more strokes that already appeared on a previous summary page.

After the first summary page has been created, the algorithm accesses the database to find another stroke of the set of strokes that is not part of any summary page. Once such a stroke is obtained, its associated background image is identified and all other strokes associated with that background image are obtained from the database and another summary page is created with that background image and its associated strokes.

The process is repeated until all the strokes from the set of strokes appear on at least one summary page.

Note that in one embodiment, the summary pages are ordered by the time at which the first stroke was added to a page.

An Example of a Computer System

FIG. 11 is a block diagram of a computer system 1100 that may be used to practice an embodiment of the present invention. In one embodiment, computer system 1100 may be used to implement one or more of the components illustrated in FIG. 1 and described above. As shown in FIG. 11, computer system 1100 includes a processor 1102 that communicates with a number of peripheral subsystems via a bus subsystem 1104. These peripheral subsystems may include a storage subsystem 1106, comprising a memory subsystem 1108 and a file storage subsystem 1110, user interface input devices 1112, user interface output devices 1114, and a network interface subsystem 1116.

Bus subsystem 1104 provides a mechanism for enabling the various components and subsystems of computer system 1100 to communicate with each other as intended. Although bus subsystem 1104 is shown schematically as a single bus, alternative embodiments of the bus subsystem may utilize multiple busses.

Network interface subsystem 1116 provides an interface to other computer systems, networks, and storage. Network interface subsystem 1116 serves as an interface for receiving data from and transmitting data to other systems from computer system 1100. For example, network interface subsystem 1116 of an IWB system may enable a controller to communicate with other remotely located IWB systems via a communication network such as the Internet.

User interface input devices 1112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 1100.

User interface output devices 1114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1100.

Storage subsystem 1106 provides a computer-readable storage medium for storing the basic programming and data constructs that provide the functionality of the present invention. Software (programs, code modules, instructions) that when executed by a processor provide the functionality of the present invention may be stored in storage subsystem 1106. These software modules or instructions may be executed by processor(s) 1102. Storage subsystem 1106 may also provide a repository for storing data used in accordance with the present invention. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 1100 can be of various types including a personal computer, a phone, a portable computer, a workstation, a network computer, or any other data processing system. Due to the ever-changing nature of computers and networks, the description of computer system 1100 depicted in FIG. 11 is intended only as a specific example for purposes of illustrating the preferred embodiment of the computer system. Many other configurations having more or fewer components than the system depicted in FIG. 11 are possible.

Although specific embodiments of the invention have been described, various modifications, alterations, alternative constructions, and equivalents are also encompassed within the scope of the invention. The teachings described above may be applied to any system comprising a processor that can be booted or rebooted. For example, while embodiments have been described above using certain systems as examples, this is not intended to be restrictive. The teachings described above and recited in the claims may also be practiced by other computing systems that enable strokes on a screen to be accepted, matched to underlying image patches of a document image, and then redraw or removed based on whether the image patches are found in a new document image.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A system for associating strokes with image data, the system comprising:
 a display surface;
 a memory coupled to the display surface to store stroke contexts for a plurality of strokes, wherein each stroke context represents an association between at least one stroke and a portion of image data previously displayed;
 a stroke capture module operable with the display surface and communicably coupled with the memory to capture one or more strokes written over image data presented on the display surface; and
 a summarization unit coupled to the memory to generate at least one summary page of a session based on content displayed during the session containing one or more strokes made during the session, wherein the at least one summary page comprises a composition of a background image corresponding to content displayed during the session that is associated with at least one stroke made during the session, with all strokes associated with the content during the session incorporated onto the background image.

2. The system defined in claim 1 wherein the summarization unit is operable to generate the at least one summary page by:
 a) accessing the memory to obtain stroke data corresponding to a first stroke that is not part of a summary page, the first stroke being associated with first image data;
 b) accessing the memory to obtain stroke data corresponding to any other stroke that is associated with the first image data;
 c) forming a first summary page with the first stroke and said any other stroke associated with first image data; and
 d) repeating a)-c) for another stroke that is not part of a summary page.

3. The system defined in claim 2 further comprising e) repeating d) until all strokes have been included in at least one summary page.

4. The system defined in claim 1 wherein the summarization unit selects content for the summary based on user strokes.

5. The system defined in claim 1 wherein the summary is based on strokes automatically matched with content.

6. The system defined in claim 1 wherein the summary contains an output containing all strokes that occurred at least once.

7. The system defined in claim 1 wherein the summary is generated as the system is being used.

8. The system defined in claim 1 wherein the summary comprises a plurality of pages that are currently displayed in one or more windows on the display surface.

9. A method comprising:
 capturing, by a display surface, one or more strokes written over content being shown on the display surface;
 associating, by a processor communicably coupled with the display surface, captured stroke data corresponding to the one or more strokes with the content over which they are written to create stroke contexts, wherein each stroke context represents an association between at least one stroke and a portion of content previously displayed on a display surface;
 storing, in a memory coupled with the display surface and the processor, stroke contexts for the one or more strokes; and
 generating, by the processor, at least one summary page of a session based on content displayed during the session containing one or more strokes made during the session, wherein the at least one summary page comprises a composition of a background image corresponding to content displayed during the session that is associated with at least one stroke made during the session, with all strokes associated with the content during the session incorporated onto the background image.

10. The method defined in claim 9 wherein generating the at least one summary page comprises:
 a) accessing the memory to obtain stroke data corresponding to a first stroke that is not part of a summary page, the first stroke being associated with first image data;
 b) accessing the memory to obtain stroke data corresponding to any other stroke that is associated with the first image data;
 c) forming a first summary page with the first stroke and said any other stroke associated with first image data; and
 d) repeating a)-c) for another stroke that is not part of a summary page.

11. The method defined in claim 10 wherein the method further comprises e) repeating d) until all strokes have been included in at least one summary page.

12. The method defined in claim 9 further comprising selecting content for the summary based on user strokes.

13. The method defined in claim 9 wherein the summary is based on strokes automatically matched with content.

14. The method defined in claim 9 wherein the summary contains an output containing all strokes that occurred at least once.

15. The method defined in claim 9 wherein the summary comprises a plurality of pages that are currently displayed in one or more windows on the display surface.

16. A non-transitory computer readable media storing instructions thereon which, when executed by a system, cause the system to perform a method comprising:

capturing one or more strokes written over content being shown on the display surface;

associating captured stroke data corresponding to the one or more strokes with the content over which they are written to create stroke contexts, wherein each stroke context represents an association between at least one stroke and a portion of content previously displayed on a display surface;

storing stroke contexts for the one or more strokes in a memory; and generating at least one summary page of a session based on content displayed during the session containing one or more strokes made during the session, wherein the at least one summary page comprises a composition of a background image corresponding to content displayed during the session that is associated with at least one stroke made during the session, with all strokes associated with the content during the session incorporated onto the background image.

17. The non-transitory computer readable media defined in claim 16 wherein generating the at least one summary page comprises:

a) accessing the memory to obtain stroke data corresponding to a first stroke that is not part of a summary page, the first stroke being associated with first image data;

b) accessing the memory to obtain stroke data corresponding to any other stroke that is associated with the first image data;

c) forming a first summary page with the first stroke and said any other stroke associated with first image data; and d) repeating a)-c) for another stroke that is not part of a summary page.

18. The non-transitory computer readable media defined in claim 17 wherein the method further comprises e) repeating d) until all strokes have been included in at least one summary page.

19. The non-transitory computer readable media defined in claim 16 wherein the summary contains an output containing all strokes that occurred at least once.

20. The non-transitory computer readable media defined in claim 16 wherein the summary comprises a plurality of pages that are currently displayed in one or more windows on the display surface.

* * * * *